(12) United States Patent
Abedini et al.

(10) Patent No.: US 11,317,356 B2
(45) Date of Patent: Apr. 26, 2022

(54) TECHNIQUES FOR RESOURCE-SPECIFIC TRANSMIT POWER CONTROL CONFIGURATION

(71) Applicant: QUALCOMM Incorporated, San Diego, CA (US)

(72) Inventors: Navid Abedini, Basking Ridge, NJ (US); Wanshi Chen, San Diego, CA (US); Tao Luo, San Diego, CA (US)

(73) Assignee: QUALCOMM incorporated, San Diego, CA (US)

( * ) Notice: Subject to any disclaimer, the term of this patent is extended or adjusted under 35 U.S.C. 154(b) by 0 days.

(21) Appl. No.: 17/135,458

(22) Filed: Dec. 28, 2020

(65) Prior Publication Data
US 2021/0266843 A1    Aug. 26, 2021

Related U.S. Application Data

(60) Provisional application No. 62/979,873, filed on Feb. 21, 2020.

(51) Int. Cl.
*H04W 52/14*    (2009.01)
(52) U.S. Cl.
CPC ................... *H04W 52/146* (2013.01)
(58) Field of Classification Search
CPC ............. H04W 52/146; H04W 52/225; H04W 52/325
USPC ................. 455/522, 69, 452.1, 509
See application file for complete search history.

(56) References Cited

U.S. PATENT DOCUMENTS

| 2015/0124673 | A1* | 5/2015 | Ouchi | H04W 52/362 |
| | | | | 370/311 |
| 2019/0141640 | A1* | 5/2019 | Abedini | H04W 52/146 |
| 2019/0319823 | A1* | 10/2019 | Akkarakaran | H04B 7/0408 |

FOREIGN PATENT DOCUMENTS

EP    2849504 A1    3/2015

OTHER PUBLICATIONS

International Search Report and Written Opinion—PCT/US2021/070078—ISA/EPO—dated May 11, 2021.

\* cited by examiner

*Primary Examiner* — John J Lee
(74) *Attorney, Agent, or Firm* — Dalei Dong; Harrity & Harrity, LLP

(57) ABSTRACT

Various aspects of the present disclosure generally relate to wireless communication. In some aspects, a wireless node may receive a plurality of sets of parameters for uplink transmit power control configuration; select a set of parameters, from the plurality of sets of parameters, based at least in part on a configuration of an uplink communication; select one or more parameters from the set of parameters based at least in part on the configuration of the uplink communication; and transmit the uplink communication in accordance with the one or more parameters. Numerous other aspects are provided.

30 Claims, 11 Drawing Sheets

TECHNIQUES FOR RESOURCE-SPECIFIC TRANSMIT POWER CONTROL CONFIGURATION

CROSS-REFERENCE TO RELATED APPLICATION

This Patent Application claims priority to U.S. Provisional Patent Application No. 62/979,873, filed on Feb. 21, 2020, entitled "TECHNIQUES FOR RESOURCE-SPECIFIC TRANSMIT POWER CONTROL CONFIGURATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for resource-specific transmit power control configuration.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a wireless node includes receiving a plurality of sets of parameters for uplink transmit power control configuration; selecting a set of parameters, from the plurality of sets of parameters, based at least in part on a configuration of an uplink communication; selecting one or more parameters from the set of parameters based at least in part on the configuration of the uplink communication; and transmitting the uplink communication in accordance with the one or more parameters.

In some aspects, the uplink communication is one of: a physical uplink control channel communication, a physical uplink shared channel communication, a sounding reference signal communication, or a physical random access channel communication. In some aspects, the plurality of sets of parameters is a plurality of mappings of sounding reference signal resource indicators (SRIs) to physical uplink shared channel (PUSCH) power control parameters. In some aspects, signaling associated with identifying the plurality of sets of parameters includes one of: an extended mapping field identifying a plurality of SRI mappings, a non-extended mapping field with a plurality of sub-fields identifying a plurality of SRI mappings, or a plurality of SRI mapping fields corresponding to a plurality communication scenarios. In some aspects, selecting the set of parameters comprises selecting the set of parameters based at least in part on at least one of: a resource set for the uplink communication, an operation mode for the uplink communication, or an explicit indicator in a control information message.

In some aspects, the set of parameters includes a plurality of pairs of P0 and alpha parameters; and selecting the one or more parameters of the set of parameters comprises selecting a pair of P0 and alpha parameters, of the plurality of pairs of P0 and alpha parameters, based at least in part on at least one of: a resource set for the uplink communication, an operation mode for the uplink communication, or an explicit indicator in a control information message. In some aspects, the method includes receiving signaling identifying the configuration of the uplink communication, wherein the signaling does not include a field identifying a selection of the set of parameters; and wherein selecting the set of parameters comprises selecting the set of parameters based at least in part on at least one of a resource set for the uplink communication or an operation mode for the uplink communication.

In some aspects, the uplink communication is a physical uplink shared channel communication and the one or more parameters include a P0 parameter and an alpha parameter, and selecting the one or more parameters of the set of parameters includes selecting a pair of P0 and alpha parameters, of the plurality of pairs of P0 and alpha parameters, based at least in part on at least one of: a resource set for the uplink communication, an operation mode for the uplink communication, or an explicit indicator in a control information message. In some aspects, the uplink communication is a physical uplink control channel (PUCCH) communication and the one or more parameters include a P0 per spatial relation information parameter or a spatial relation information per PUCCH parameter. In some aspects, the uplink communication is a sounding reference signal communication and the one or more parameters include a P0 parameter and an alpha parameter.

In some aspects, the set of parameters is a range of accumulated delta values or absolute delta values for closed loop power control. In some aspects, selecting the set of parameters comprises selecting the range of accumulated delta values or absolute delta values based at least in part on at least one of: a resource set for the uplink communication, an operation mode for the uplink communication, signaling dynamically configuring the uplink communication, or signaling identifying the plurality of sets of parameters. In some aspects, an association between the plurality of sets of parameters and the configuration of the uplink communication is explicitly indicated. In some aspects, an association between the plurality of sets of parameters and the configuration of the uplink communication is based at least in part on a type of a resource on which the uplink communication is scheduled.

In some aspects, the type of the resource is one of uplink, flexible, downlink, or full-duplex. In some aspects, an association between the plurality of sets of parameters and the configuration of the uplink communication is based at least in part on whether the uplink communication is scheduled on a resource that is configured as hard or soft for the wireless node. In some aspects, an association between the plurality of sets of parameters and the configuration of the uplink communication is based at least in part on a mode of operation for the uplink communication. In some aspects, the mode of operation is determined based at least in part on a semi-static resource allocation, a dynamic scheduling message, or a semi-static scheduling message.

In some aspects, the mode of operation is based at least in part on whether the wireless node transmits or receives a second communication on resources at least partially overlapping with resources on which the wireless node transmits the uplink communication. In some aspects, the one or more parameters include at least one of an open loop power control parameter or a closed loop power control parameter. In some aspects, the wireless node is a user equipment (UE) or an integrated access and backhauling (IAB)-node mobile terminal (MT) (IAB-MT).

In some aspects, a non-transitory computer-readable medium storing one or more instructions for wireless communication includes one or more instructions that, when executed by one or more processors of a wireless node, cause the one or more processors to: receive a plurality of sets of parameters for uplink transmit power control configuration; select a set of parameters, from the plurality of sets of parameters, based at least in part on a configuration of an uplink communication; select one or more parameters from the set of parameters based at least in part on the configuration of the uplink communication; and transmit the uplink communication in accordance with the one or more parameters.

In some aspects, the uplink communication is one of: a physical uplink control channel communication, a physical uplink shared channel communication, a sounding reference signal communication, or a physical random access channel communication. In some aspects, the plurality of sets of parameters is a plurality of mappings of SRIs to PUSCH power control parameters. In some aspects, signaling associated with identifying the plurality of sets of parameters includes one of: an extended mapping field identifying a plurality of SRI mappings, a non-extended mapping field with a plurality of sub-fields identifying a plurality of SRI mappings, or a plurality of SRI mapping fields corresponding to a plurality communication scenarios. In some aspects, the one or more instructions, that cause the one or more processors to select the set of parameters, cause the one or more processors to select the set of parameters based at least in part on at least one of: a resource set for the uplink communication, an operation mode for the uplink communication, or an explicit indicator in a control information message.

In some aspects, the set of parameters includes a plurality of pairs of P0 and alpha parameters; and the one or more instructions, that cause the one or more processors to select the one or more parameters of the set of parameters, cause the one or more processors to select a pair of P0 and alpha parameters, of the plurality of pairs of P0 and alpha parameters, based at least in part on at least one of: a resource set for the uplink communication, an operation mode for the uplink communication, or an explicit indicator in a control information message. In some aspects, the one or more instructions, when executed by the one or more processors, further cause the one or more processors to receive signaling identifying the configuration of the uplink communication, wherein the signaling does not include a field identifying a selection of the set of parameters; and wherein the one or more instructions, that cause the one or more processors to select the set of parameters, cause the one or more processors to select the set of parameters based at least in part on at least one of a resource set for the uplink communication or an operation mode for the uplink communication. In some aspects, the uplink communication is a physical uplink shared channel communication and the one or more parameters include a P0 parameter and an alpha parameter.

In some aspects, the uplink communication is a PUCCH communication and the one or more parameters include a P0 per spatial relation information parameter or a spatial relation information per PUCCH parameter. In some aspects, the uplink communication is a sounding reference signal communication and the one or more parameters include a P0 parameter and an alpha parameter. In some aspects, the set of parameters is a range of accumulated delta values or absolute delta values for closed loop power control. In some aspects, the one or more instructions cause the one or more processors to select a range of accumulated delta values or absolute delta values based at least in part on at least one of: a resource set for the uplink communication, an operation mode for the uplink communication, signaling dynamically configuring the uplink communication, or signaling identifying the plurality of sets of parameters.

In some aspects, an association between the plurality of sets of parameters and the configuration of the uplink communication is explicitly indicated. In some aspects, an association between the plurality of sets of parameters and the configuration of the uplink communication is based at least in part on a type of a resource on which the uplink communication is scheduled. In some aspects, the type of the resource is one of uplink, flexible, downlink, or full-duplex. In some aspects, an association between the plurality of sets of parameters and the configuration of the uplink communication is based at least in part on whether the uplink communication is scheduled on a resource that is configured as hard or soft for the wireless node. In some aspects, an association between the plurality of sets of parameters and the configuration of the uplink communication is based at least in part on a mode of operation for the uplink communication.

In some aspects, the mode of operation is determined based at least in part on a semi-static resource allocation, a dynamic scheduling message, or a semi-static scheduling message. In some aspects, the mode of operation is based at least in part on whether the wireless node transmits or receives a second communication on resources at least partially overlapping with resources on which the wireless node transmits the uplink communication. In some aspects, the one or more parameters include at least one of an open loop power control parameter or a closed loop power control parameter. In some aspects, the wireless node is a UE or an IAB-MT.

In some aspects, an apparatus for wireless communication includes means for receiving a plurality of sets of parameters for uplink transmit power control configuration; means for selecting a set of parameters, from the plurality of sets of parameters, based at least in part on a configuration of an uplink communication; means for selecting one or more parameters from the set of parameters based at least in part on the configuration of the uplink communication; and means for transmitting the uplink communication in accordance with the one or more parameters.

In some aspects, the uplink communication is one of: a physical uplink control channel communication, a physical uplink shared channel communication, a sounding reference signal communication, or a physical random access channel communication. In some aspects, the plurality of sets of parameters is a plurality of mappings of SRIs to PUSCH power control parameters. In some aspects, signaling associated with identifying the plurality of sets of parameters includes one of: an extended mapping field identifying a plurality of SRI mappings, a non-extended mapping field with a plurality of sub-fields identifying a plurality of SRI mappings, or a plurality of SRI mapping fields corresponding to a plurality communication scenarios.

In some aspects, the means for selecting the set of parameters comprises means for selecting the set of parameters based at least in part on at least one of: a resource set for the uplink communication, an operation mode for the uplink communication, or an explicit indicator in a control information message. In some aspects, the set of parameters includes a plurality of pairs of P0 and alpha parameters, and the means for selecting the one or more parameters of the set of parameters comprises means for selecting a pair of P0 and alpha parameters, of the plurality of pairs of P0 and alpha parameters, based at least in part on at least one of: a resource set for the uplink communication, an operation mode for the uplink communication, or an explicit indicator in a control information message.

In some aspects, the apparatus includes means for receiving signaling identifying the configuration of the uplink communication, wherein the signaling does not include a field identifying a selection of the set of parameters; and wherein the means for selecting the set of parameters comprises means for selecting the set of parameters based at least in part on at least one of a resource set for the uplink communication or an operation mode for the uplink communication. In some aspects, the means for selecting the set of parameters comprises means for selecting the set of parameters based at least in part on at least one of a resource set for the uplink communication or an operation mode for the uplink communication. In some aspects, the uplink communication is a physical uplink shared channel communication and the one or more parameters include a P0 parameter and an alpha parameter. In some aspects, the uplink communication is a PUCCH communication and the one or more parameters include a P0 per spatial relation information parameter or a spatial relation information per PUCCH parameter.

In some aspects, the uplink communication is a sounding reference signal communication and the one or more parameters include a P0 parameter and an alpha parameter. In some aspects, the set of parameters is a range of accumulated delta values or absolute delta values for closed loop power control. In some aspects, the means for selecting the set of parameters comprises means for selecting the range of accumulated delta values or absolute delta values based at least in part on at least one of: a resource set for the uplink communication, an operation mode for the uplink communication, signaling dynamically configuring the uplink communication, or signaling identifying the plurality of sets of parameters. In some aspects, an association between the plurality of sets of parameters and the configuration of the uplink communication is explicitly indicated.

In some aspects, an association between the plurality of sets of parameters and the configuration of the uplink communication is based at least in part on a type of a resource on which the uplink communication is scheduled. In some aspects, the type of the resource is one of uplink, flexible, downlink, or full-duplex. In some aspects, an association between the plurality of sets of parameters and the configuration of the uplink communication is based at least in part on whether the uplink communication is scheduled on a resource that is configured as hard or soft for the apparatus. In some aspects, an association between the plurality of sets of parameters and the configuration of the uplink communication is based at least in part on a mode of operation for the uplink communication. In some aspects, the mode of operation is determined based at least in part on a semi-static resource allocation, a dynamic scheduling message, or a semi-static scheduling message. In some aspects, the mode of operation is based at least in part on whether the apparatus transmits or receives a second communication on resources at least partially overlapping with resources on which the apparatus transmits the uplink communication. In some aspects, the one or more parameters include at least one of an open loop power control parameter or a closed loop power control parameter. In some aspects, the apparatus is a UE or an IAB-MT.

In some aspects, a wireless node for wireless communication includes a memory and one or more processors coupled to the memory, the memory and the one or more processors configured to: receive a plurality of sets of parameters for uplink transmit power control configuration; select a set of parameters, from the plurality of sets of parameters, based at least in part on a configuration of an uplink communication; select one or more parameters from the set of parameters based at least in part on the configuration of the uplink communication; and transmit the uplink communication in accordance with the one or more parameters.

In some aspects, the uplink communication is one of: a physical uplink control channel communication, a physical uplink shared channel communication, a sounding reference signal communication, or a physical random access channel communication. In some aspects, the plurality of sets of parameters is a plurality of mappings of SRIs to PUSCH power control parameters. In some aspects, the one or more processors, when transmitting signaling associated with identifying the plurality of sets of parameters, are configured to: transmit signaling including an extended mapping field identifying a plurality of SRI mappings, a non-extended mapping field with a plurality of sub-fields identifying a plurality of SRI mappings, or a plurality of SRI mapping fields corresponding to a plurality communication scenarios. In some aspects, the one or more processors, when selecting the set of parameters, are configured to select the set of parameters based at least in part on at least one of: a resource set for the uplink communication, an operation mode for the uplink communication, or an explicit indicator in a control information message.

In some aspects, the set of parameters includes a plurality of pairs of P0 and alpha parameters; and the one or more processors, when selecting the one or more parameters of the set of parameters, are configured to select a pair of P0 and alpha parameters, of the plurality of pairs of P0 and alpha parameters, based at least in part on at least one of: a resource set for the uplink communication, an operation mode for the uplink communication, or an explicit indicator in a control information message. In some aspects, the one or more processors are further configured to receive signaling identifying the configuration of the uplink communication, wherein the signaling does not include a field identifying a selection of the set of parameters, and wherein the one or more processors, when selecting the set of parameters, are configured to select the set of parameters based at least in part on at least one of a resource set for the uplink communication or an operation mode for the uplink communication. In some aspects, the uplink communication is a physical uplink shared channel communication and the one or more parameters include a P0 parameter and an alpha parameter.

In some aspects, the uplink communication is a PUCCH communication and the one or more parameters include a P0 per spatial relation information parameter or a spatial relation information per PUCCH parameter. In some aspects, the uplink communication is a sounding reference signal communication and the one or more parameters include a P0 parameter and an alpha parameter. In some aspects, the set of parameters is a range of accumulated delta values or absolute delta values for closed loop power control. In some aspects, the one or more processors, when selecting the set of parameters, are configured to select a range of accumulated delta values or absolute delta values based at least in part on at least one of: a resource set for the uplink communication, an operation mode for the uplink communication, signaling dynamically configuring the uplink communication, or signaling identifying the plurality of sets of parameters. In some aspects, an association between the plurality of sets of parameters and the configuration of the uplink communication is explicitly indicated.

In some aspects, an association between the plurality of sets of parameters and the configuration of the uplink communication is based at least in part on a type of a resource on which the uplink communication is scheduled. In some aspects, the type of the resource is one of uplink, flexible, downlink, or full-duplex. In some aspects, an association between the plurality of sets of parameters and the configuration of the uplink communication is based at least in part on whether the uplink communication is scheduled on a resource that is configured as hard or soft for the wireless node. In some aspects, an association between the plurality of sets of parameters and the configuration of the uplink communication is based at least in part on a mode of operation for the uplink communication.

In some aspects, the mode of operation is determined based at least in part on a semi-static resource allocation, a dynamic scheduling message, or a semi-static scheduling message. In some aspects, the mode of operation is based at least in part on whether the wireless node transmits or receives a second communication on resources at least partially overlapping with resources on which the wireless node transmits the uplink communication. In some aspects, the one or more parameters include at least one of an open loop power control parameter or a closed loop power control parameter. In some aspects, the wireless node is a UE or an IAB-MT.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
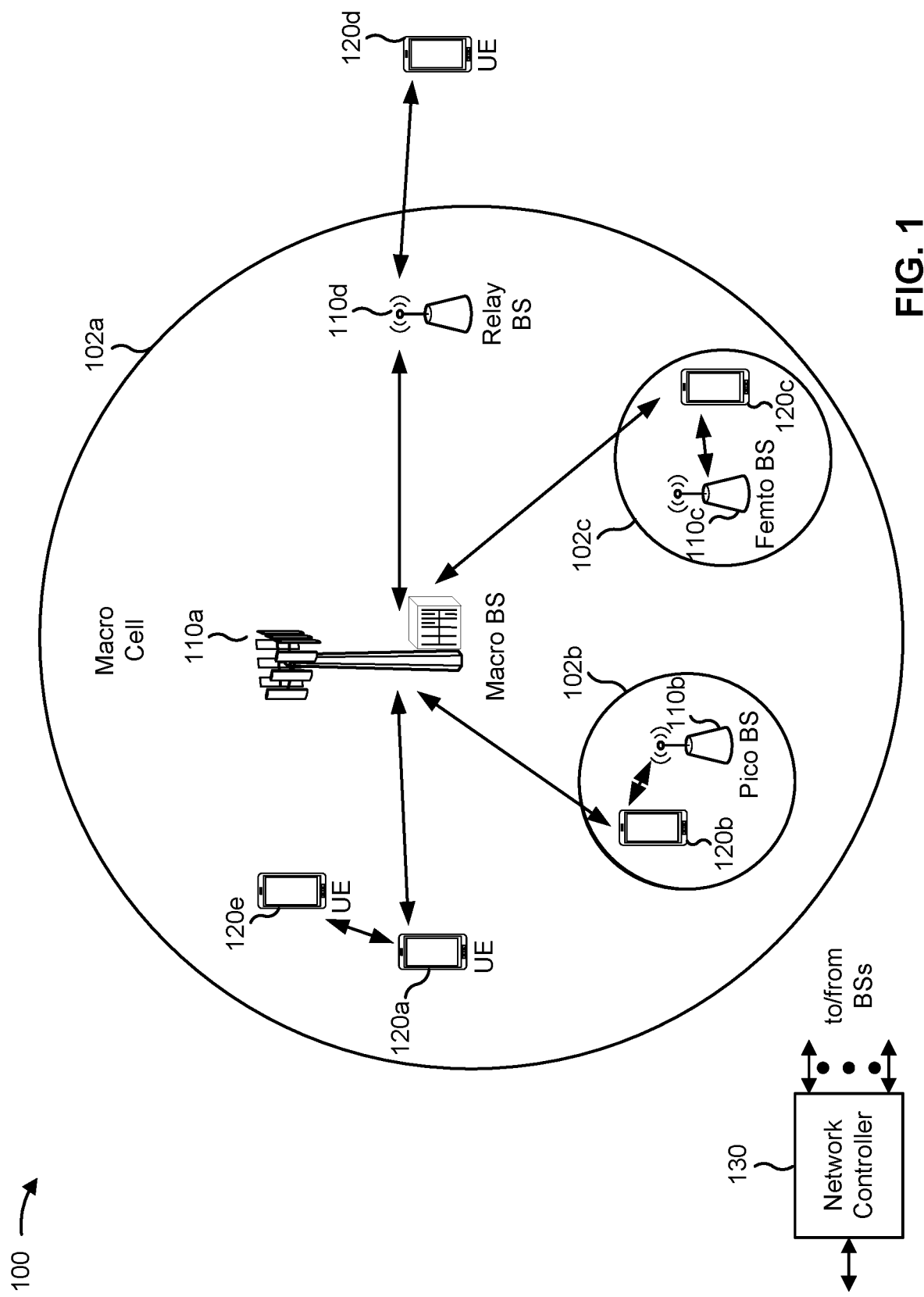
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
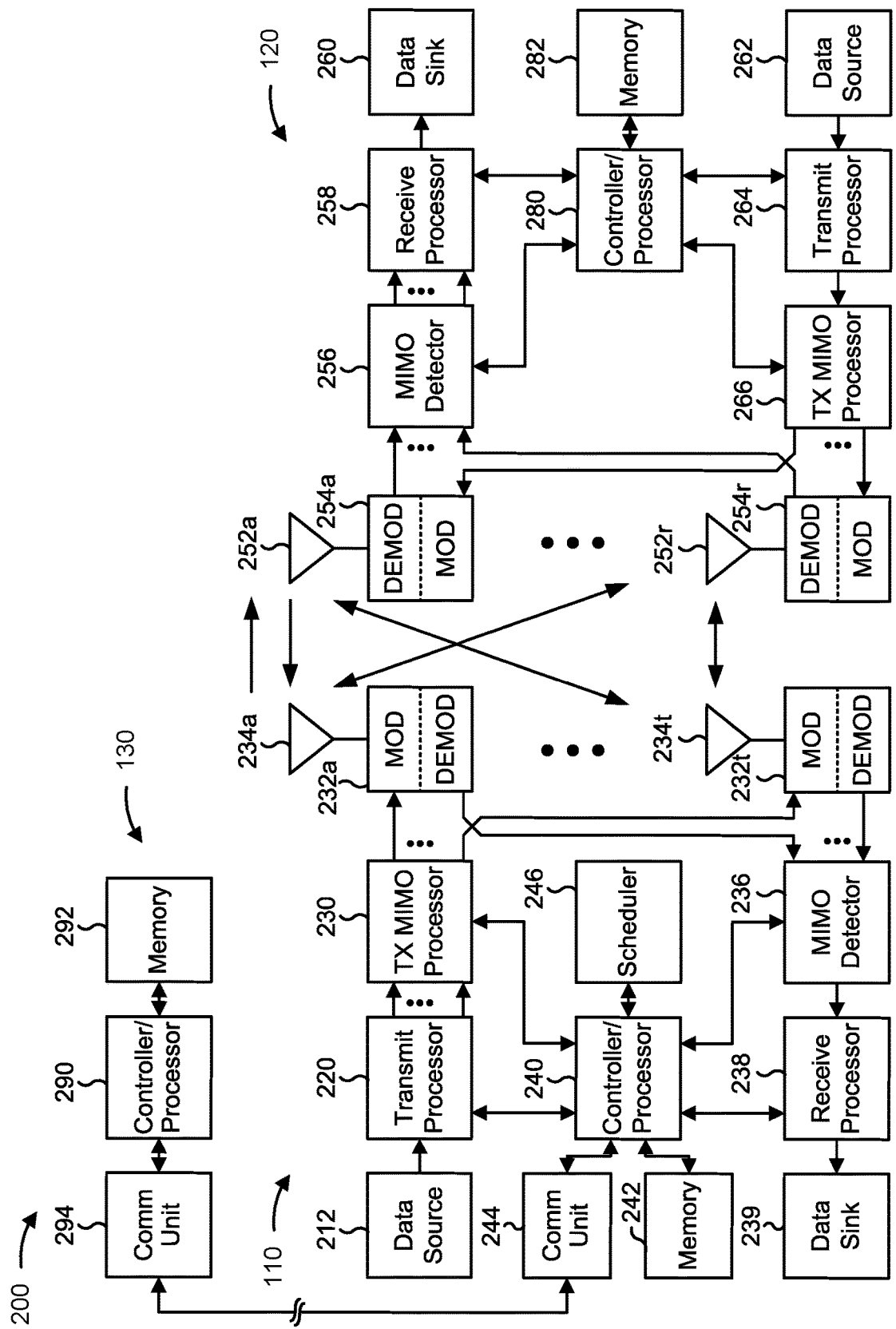
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with resource-specific transmit power control configuration, as described in more detail elsewhere herein. For example, controller/processor 240 of base station 110, controller/processor 280 of UE 120, and/or any other component(s) of FIG. 2 may perform or direct operations of, for example, process 1000 of FIG. 10 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 1000 of FIG. 10 and/or other processes as described herein. A scheduler 246 may schedule UEs for data transmission on the downlink and/or uplink.

In some aspects, a wireless node, such as a BS 110 or a UE 120, may include means for receiving a plurality of sets of parameters for uplink transmit power control configuration, means for selecting a set of parameters, from the plurality of sets of parameters, based at least in part on a configuration of an uplink communication, means for selecting one or more parameters from the set of parameters based at least in part on the configuration of the uplink communication, means for transmitting the uplink communication in accordance with the one or more parameters, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of BS 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
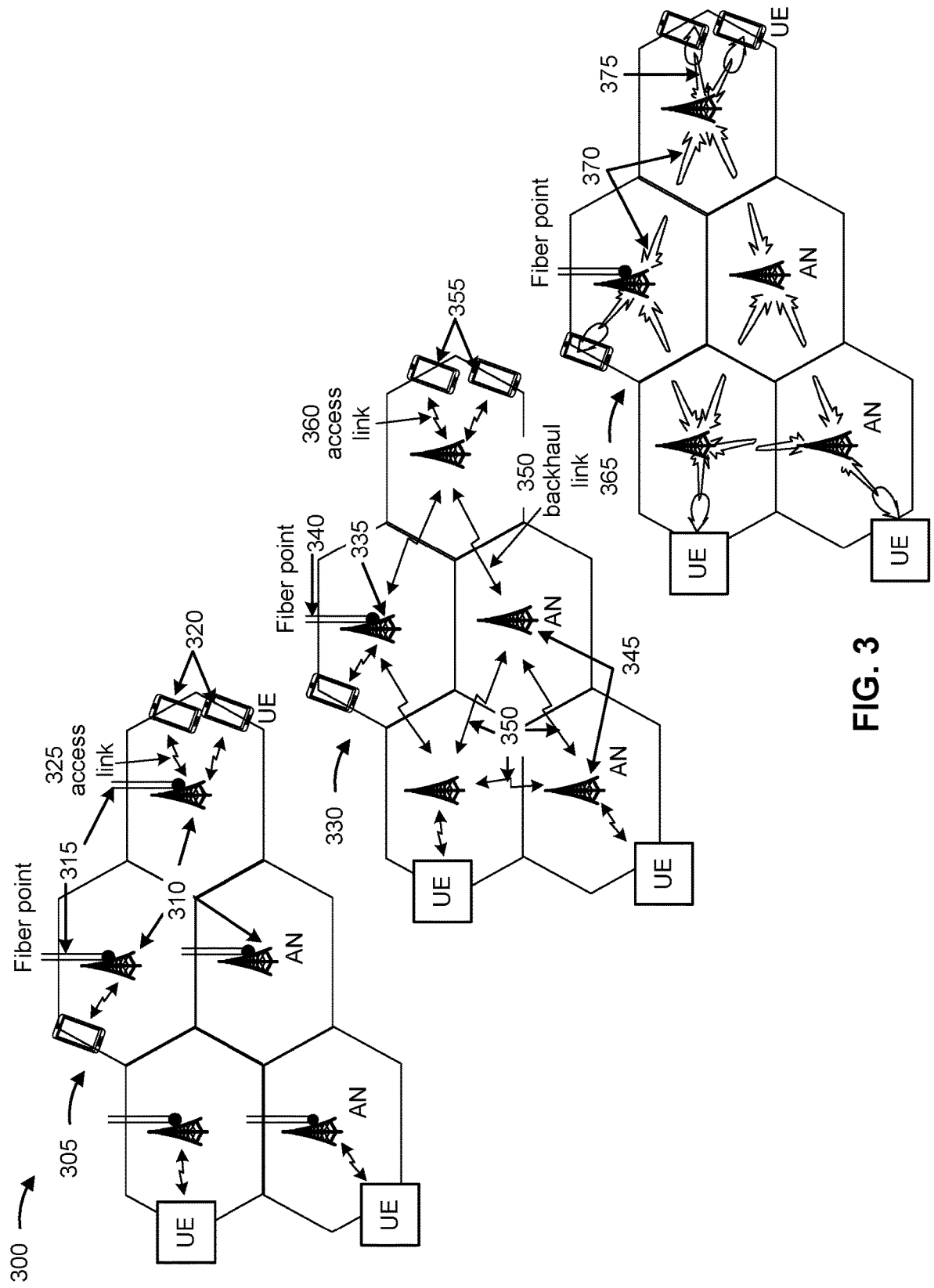
FIG. 3 is a diagram illustrating an example of radio access networks, in accordance with various aspects of the disclosure.

FIG. 3 is a diagram illustrating examples 300 of radio access networks, in accordance with various aspects of the disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in 3 may be a base station 110 shown in FIG. 1. In some aspects, a UE 320 shown in 3 may be a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming and/or the like) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming and/or the like. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in 3 is shown as an example, and other examples are contemplated. For example, one or more base stations illustrated in FIG. 3 may be replaced by one or more UEs that communicate via a UE-to-UE access network (e.g., a peer-to-peer network, a device-to-device network, and/or the like). In this case, "anchor node" may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
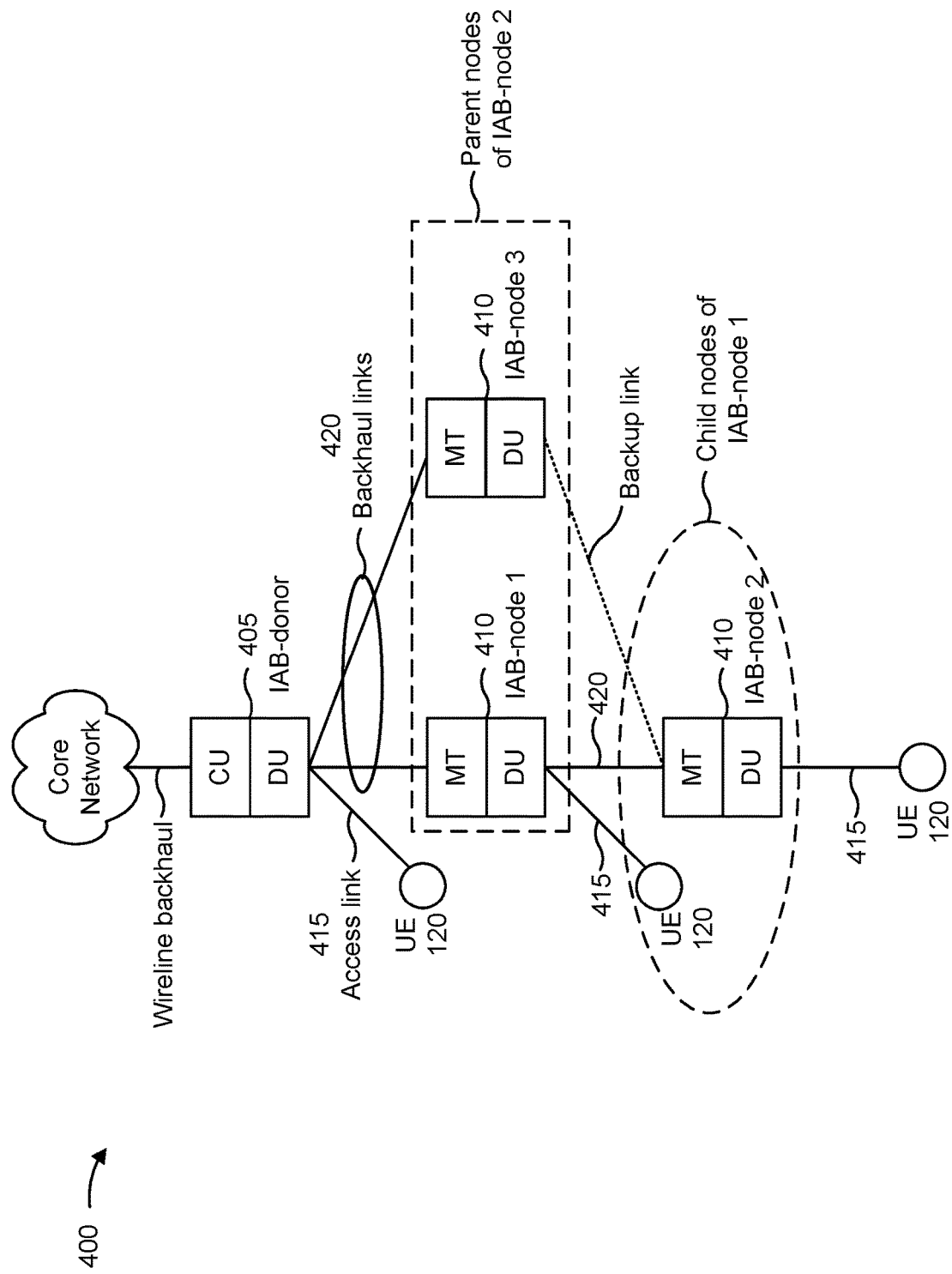
FIG. 4 is a diagram illustrating an example of an integrated access and backhauling (IAB) network architecture, in accordance with various aspects of the disclosure.

FIG. 4 is a diagram illustrating an example 400 of an IAB network architecture, in accordance with various aspects of the disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (AMF). In some aspects, an IAB donor 405 may include a base station 110, such as an anchor base station, as described above in connection with FIG. 3. As shown, an IAB donor 405 may include a central unit (CU), which may perform access node controller (ANC) functions, AMF functions, and/or the like. The CU may configure a distributed unit (DU) of the IAB donor 405 and/or may configure one or more IAB nodes 410 (e.g., an MT and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message, an F1 application protocol (FLAP) message, and/or the like).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include mobile termination (MT) functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, spatial resources, and/or the like) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, becomes overloaded, and/or the like. For example, a backup link between IAB-node 2 and IAB-node 3 may be used for backhaul communications if a primary backhaul link between IAB-node 2 and IAB-node 1 fails. As used herein, "node" or "wireless node" may refer to an IAB donor 405 or an IAB node 410.

As indicated above, FIG. 4 is provided as an example. Other examples may differ from what is described with regard to FIG. 4.

Figure 5:
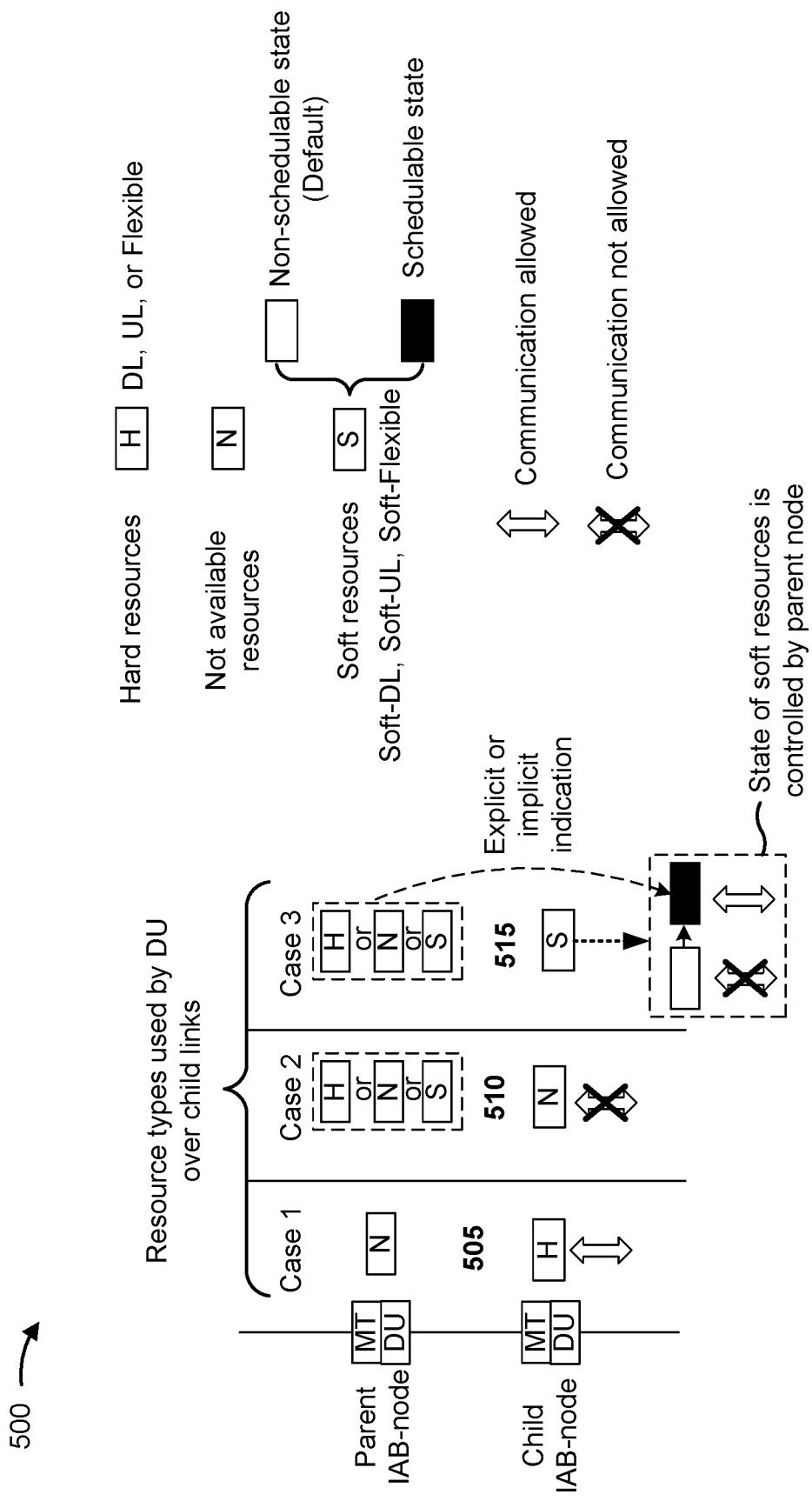
FIG. 5 is a diagram illustrating an example of resource types in an IAB network, in accordance with various aspects of the disclosure.

FIG. 5 is a diagram illustrating an example 500 of resource types in an IAB network, in accordance with various aspects of the disclosure.

In an IAB network, time domain resources (sometimes referred to as time resources) may be configured as downlink-only, uplink-only, flexible, full-duplex, or not available (e.g., unavailable). When a time resource is configured as downlink-only for a wireless node, that time resource may be available for only downlink communications of the wireless node, and not uplink communications. Similarly, when a time resource is configured as uplink-only for a wireless node, that time resource may be available for only uplink communications of the wireless node, and not downlink communications. When a time resource is configured as flexible for a wireless node, that time resource may be available for both downlink communications and uplink communications of the wireless node. When a time resource is configured as not available for a wireless node, that time resource may not be used for any communications of the wireless node.

Examples of downlink communications include synchronization signal blocks (SSBs), channel state information reference signals (CSI-RS), physical downlink control channel (PDCCH) communications, physical downlink shared channel (PDSCH) communications, and/or the like. Examples of uplink communications include physical random access channel (PRACH) communications, physical uplink control channel (PUCCH) communications, physical uplink shared channel (PUSCH) communications, sounding reference signals (SRS), and/or the like.

Time resources in an IAB network that are configured as downlink-only, uplink-only, or flexible may be further configured as hard resources or soft resources. When a time resource is configured as a hard resource for a wireless node, that time resource is always available for communications of the wireless node. For example, a hard downlink-only time resource is always available for only downlink communications of the wireless node, a hard uplink-only time resource is always available for only uplink communications of the wireless node, and a hard flexible time resource is always available for uplink and downlink communications of the wireless node.

When a time resource is configured as a soft resource for a wireless node, the availability of that time resource is controlled by a parent node of the wireless node. For example, the parent node may indicate (e.g., explicitly or implicitly) whether a soft time resource is available for communications of the wireless node. Thus, a soft time resource may be in one of two states: a schedulable state (e.g., when the soft time resource is available for scheduling and/or communications of the wireless node) and a non-schedulable state (e.g., when the soft time resource is not available for scheduling and is not available for communications of the wireless node).

For example, a soft downlink-only time resource is only available for downlink communications of the wireless node when a parent node of the wireless node indicates that the soft downlink-only time resource is available. Similarly, a soft uplink-only time resource is only available for uplink communications of the wireless node when a parent node of the wireless node indicates that the soft uplink-only time resource is available. A soft flexible time resource is only available for uplink and downlink communications of the wireless node when a parent node of the wireless node indicates that the soft flexible time resource is available.

As an example, and as shown by reference number 505, a time resource may be configured as hard for a child node, and may be configured as not available for a parent node of the child node. In this case, the parent node cannot communicate using that time resource, but the child node can schedule communications in that time resource and/or communicate using that time resource. This configuration may reduce interference between the parent node and the child node, may reduce scheduling conflicts between the parent node and the child node, and/or the like.

As another example, and as shown by reference number 510, a time resource may be configured as not available for the child node, and may be configured as hard, soft, or not available for the parent node (e.g., depending on a network configuration, network conditions, a configuration of a parent node of the parent node, and/or the like). In this case, the child node cannot schedule communications in that time resource and cannot communicate using that time resource.

As another example, and as shown by reference number 515, a time resource may be configured as soft for the child node, and may be configured as hard, soft, or not available for the parent node (e.g., depending on a network configuration, network conditions, a configuration of a parent node of the parent node, and/or the like). In this case, the child node cannot schedule or communicate using the time resource unless the child node receives an indication (e.g., a release indication), from the parent node (e.g., explicitly or implicitly), that the time resource is available (i.e., released) for use by the child node. If the child node receives such an indication, then the child node can schedule communications in that time resource and/or communicate using that time resource.

As indicated above, FIG. 5 is provided as an example. Other examples may differ from what is described with regard to FIG. 5.

In some communications systems, a wireless node may support a plurality of different duplexing modes. For example, in a first duplexing mode, an IAB-node MT may operate in a transmit (TX) or receive (RX) mode and communicate with a parent IAB-node DU and the IAB-node MT may have an inactive DU. Additionally, or alternatively, in a second full duplexing mode, an IAB-node DU may operate in a TX or RX mode communicating with one or more child nodes (e.g., UEs or IAB-node MTs) and may have an inactive MT. Additionally, or alternatively, in a third full duplexing mode, an IAB-node MT may be in an RX mode (e.g., with a parent IAB-node DU), and may have a DU that is in a TX mode (e.g., with a child node). Many other duplexing modes are possible.

A subset of duplexing modes may be termed enhanced duplexing modes. In an enhanced duplexing mode, an IAB node may have both an MT and a DU actively operating and supporting concurrent communications on a backhaul link and a child link, respectively. Alternatively, the IAB node may have the MT concurrently communicating with a plurality of parent nodes on a common band. Alternatively, the IAB node may have the MT or the DU communicating in a full-duplex mode with a parent node or child node, respectively. In such enhanced duplexing modes, concurrent communications may use the same time resources (e.g., the same symbols or slots), but may be separated in a frequency domain (e.g., using frequency division multiplexing (FDM)) or in a spatial domain (e.g., using spatial division multiplexing (SDM)).

However, in enhanced duplexing modes, communications on a first link may cause cross-interference with concurrent communications on a second link. To mitigate cross-interference, uplink transmit power control may be performed using open loop parameters and/or closed loop parameters in accordance with an equation:

$$P_{PUSCH,b,f,c}(i, j, q_d, l) = \min \begin{cases} P_{CMAX,f,c}(i), \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{cases}$$

where $P_{PUSCH}$ is a physical uplink shared channel (PUSCH) power, $P_O$ (which may be termed 'P0') and $\alpha$ (which may be termed 'alpha') are open-loop parameters, and f is a closed loop parameter. The open loop parameter P0 may be based at least in part on a nominal PUSCH power and a UE PUSCH power, such that:

$$P_{O\_PUSCH} = P_{O\_NOMINAL\_PUSCH} + P_{O\_UE\_PUSCH}$$

In this case, a wireless node may receive signaling configuring a plurality of P0-'PUSCH-AlphaSets', where each 'P0-PUSCH-AlphaSet' is a pair of values for P0 and alpha. When the wireless node receives a downlink control information (DCI) scheduling a PUSCH, the DCI may include an SRS resource indicator (SRI) field that maps to one of the 'P0-PUSCH-AlphaSet' pairs of values based at least in part on a pre-configured mapping configuration (e.g., 'sri-PUSCH-MappingToAddModList'). Alternatively, if the DCI does not include an SRI field, the UE may be configured to select a default pair of values for P0 and alpha. With regard to closed loop power control, the closed loop parameter f may be based at least in part on an uplink transmit power control command $\delta$ (which may be termed 'delta'), as described in more detail below. The delta value may be an absolute delta value, an accumulated delta value, and/or the like.

Although some aspects are described herein in terms of PUSCH power control, other uplink channel power control schemes are possible, such as physical uplink control channel (PUCCH) power control, sounding reference signal (SRS) power control, physical random access channel (PRACH) power control, and/or the like.

However, different resources and/or operation modes may have different interference considerations resulting in different ideal transmit power control configurations. Current transmit power control procedures, as described above, provide limited flexibility to accommodate the many different resource configurations possible for the many different duplexing modes and enhanced duplexing modes.

Some aspects described herein enable resource-specific uplink transmit power control to mitigate cross-interference in enhanced duplexing modes. For example, a wireless node may receive information identifying a plurality of sets of parameters, such as mappings of SRIs to PUSCH power control parameters, P0 and alpha pairings, and/or the like, and information identifying a configuration for an uplink communication, which may include a resource configuration for the uplink communication. In this case, the wireless node may select a particular set of parameters from the plurality of sets of parameters based at least in part on the configuration for the uplink communication and may select one or more parameters from the particular set of parameters. Based at least in part on selecting the one or more parameters, the wireless node may determine an uplink transmit power and transmit an uplink communication in accordance with the uplink transmit power. In this way, the wireless node enables improved flexibility to accommodate a particular configuration for uplink communication relative to previous techniques for transmit power control that do not allow resource-specific selection of transmit power control parameter values.

Figure 6:
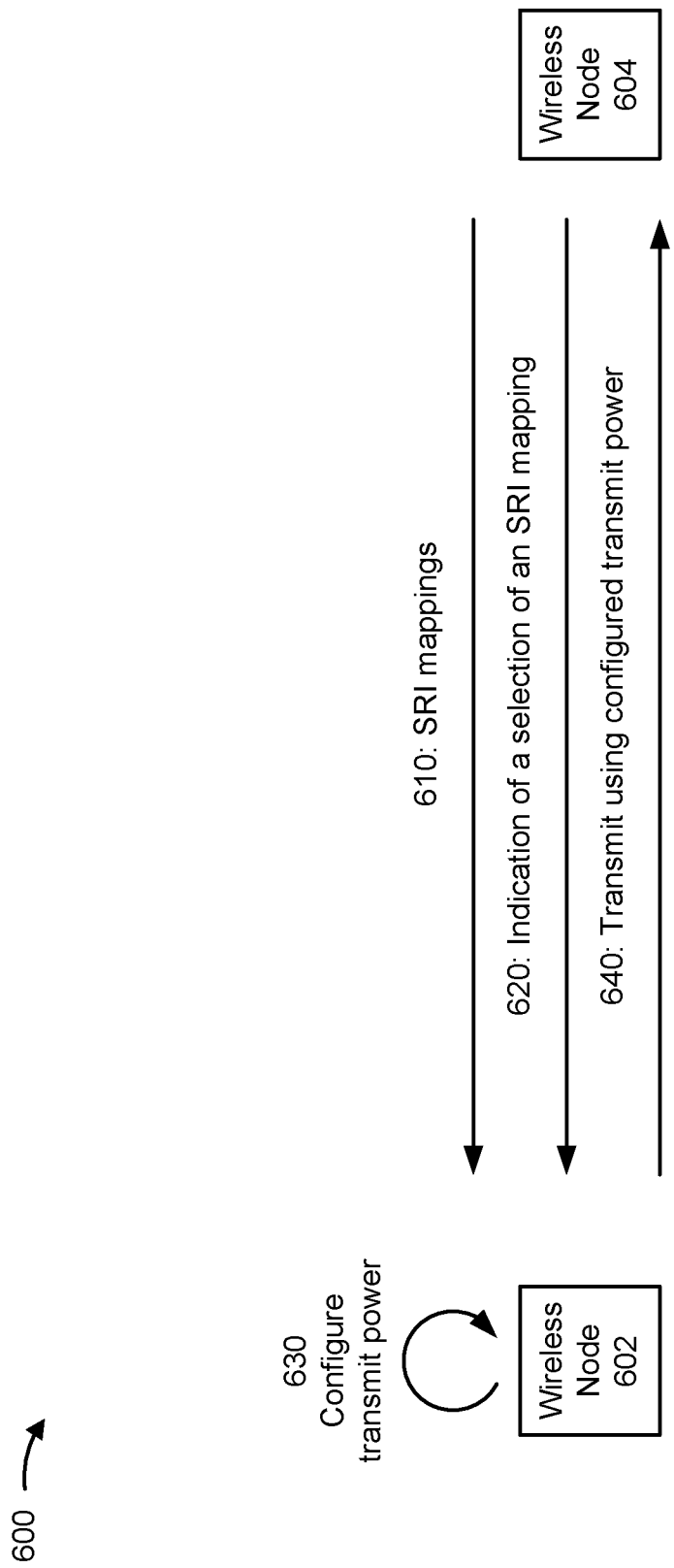
FIGS. 6-9 are diagrams illustrating examples of resource-specific transmit power control configuration, in accordance with various aspects of the present disclosure.

FIG. 6 is a diagram illustrating an example 600 of resource-specific transmit power control configuration, in accordance with various aspects of the present disclosure. As shown in FIG. 6, example 600 includes a first wireless node 602 and a second wireless node 604.

As shown in FIG. 6, and by reference number 610, wireless node 602 may receive, from wireless node 604, information identifying a plurality of SRI mappings (e.g., mappings of SRI parameters to PUSCH power control parameters). For example, wireless node 602 may receive radio resource control (RRC) signaling configuring a plurality of different SRI mappings. In some aspects, the signaling may included an extended-size mapping field. For example, wireless node 604 may extend a 16 element mapping field, used to identify a single SRI mapping list, to a 32 element mapping field that identifies a plurality of SRI mapping lists. Additionally, or alternatively, wireless node 604 may divide a 16 element mapping field into a plurality of sub-fields, each including a sub-list of SRI mappings. For example, wireless node 604 may transmit RRC signaling identifying a first 8-element SRI mapping list and a second 8-element SRI mapping list. Additionally, or alternatively, wireless node 604 may transmit RRC signaling defining a new SRI mapping list to add to one or more previously configured SRI mapping lists. Although some aspects are described herein in terms of lists, other data structures may be possible.

In some aspects, wireless node 602 may associate each of the plurality of different SRI mapping lists with a set of resources or a mode of operation. For example, wireless node 602 may determine (e.g., based at least in part on information included in the RRC signaling, a default configuration, and/or the like) that a first SRI mapping list corresponds to a first enhanced duplexing mode and a second SRI mapping list corresponds to a second enhanced duplexing mode. Additionally, or alternatively, wireless node 602 may determine that the first SRI mapping list corresponds to a first set of symbols, slots, resource blocks, or bandwidth parts, and a second SRI mapping list corresponds to a second set of symbols, slots, resource blocks, or bandwidth parts.

Additionally, or alternatively, wireless node 602 may determine that the first SRI mapping list corresponds to a first resource assignment type (e.g., full-duplex resources, uplink resources, flexible resources, or downlink resources) and that the second SRI mapping list corresponds to a second resource assignment type (e.g., full-duplex resources, uplink resources, flexible resources, or downlink resources). Additionally, or alternatively, wireless node 602 may determine that the first SRI mapping list corresponds to a first type of resource (e.g., hard resources or soft resources) and that the second SRI mapping list corresponds to a second type of resource (e.g., hard resources or soft resources).

As further shown in FIG. 6, and by reference number 620, wireless node 602 may receive information identifying an indication of a selection of an SRI mapping. For example, wireless node 602 may receive signaling identifying an upcoming uplink communication. In this case, wireless node 602 may identify an operation mode for the uplink communication, a set of resources for the uplink communication, and/or the like and may determine which SRI mapping to select. In some aspects, wireless node 602 may identify the operation mode or the set of resources based at least in part on a received semi-static resource allocation, dynamic scheduling, semi-static scheduling, and/or the like. Additionally, or alternatively, wireless node 602 may determine the operation mode based at least in part on whether wireless node 602 is configured to transmit or receive another communication on resources at least partially overlapping with the resources for the uplink communication. Based at least in part on the operation mode or the set of resources, wireless node 602 may select an SRI mapping list, from a plurality of SRI mapping lists, from which to select a particular SRI mapping to one or more PUSCH power control parameters.

Additionally, or alternatively, wireless node 602 may receive explicit signaling identifying the SRI mapping. For example, wireless node 602 may receive a DCI including one or more information elements (IEs) associated with explicitly indicating which SRI mapping to select from a determined SRI mapping list. Additionally, or alternatively, wireless node 602 may receive a medium access control (MAC) control element (CE)-based explicit indication of which SRI mapping to select.

As further shown in FIG. 6, and by reference numbers 630 and 640, wireless node 602 may configure a transmit power control (TPC) configuration and may transmit on an uplink based at least in part on the configured TPC configuration. For example, based at least in part on selecting the SRI mapping, of the plurality of configured SRI mappings in a selected SRI mapping list, wireless node 602 may determine one or more PUSCH power control parameters. In this way, wireless node 602 and wireless node 604 enable resource-specific configuration of an uplink transmit power control for an uplink communication.

As indicated above, FIG. 6 is provided as an example. Other examples may differ from what is described with respect to FIG. 6.

Figure 7:
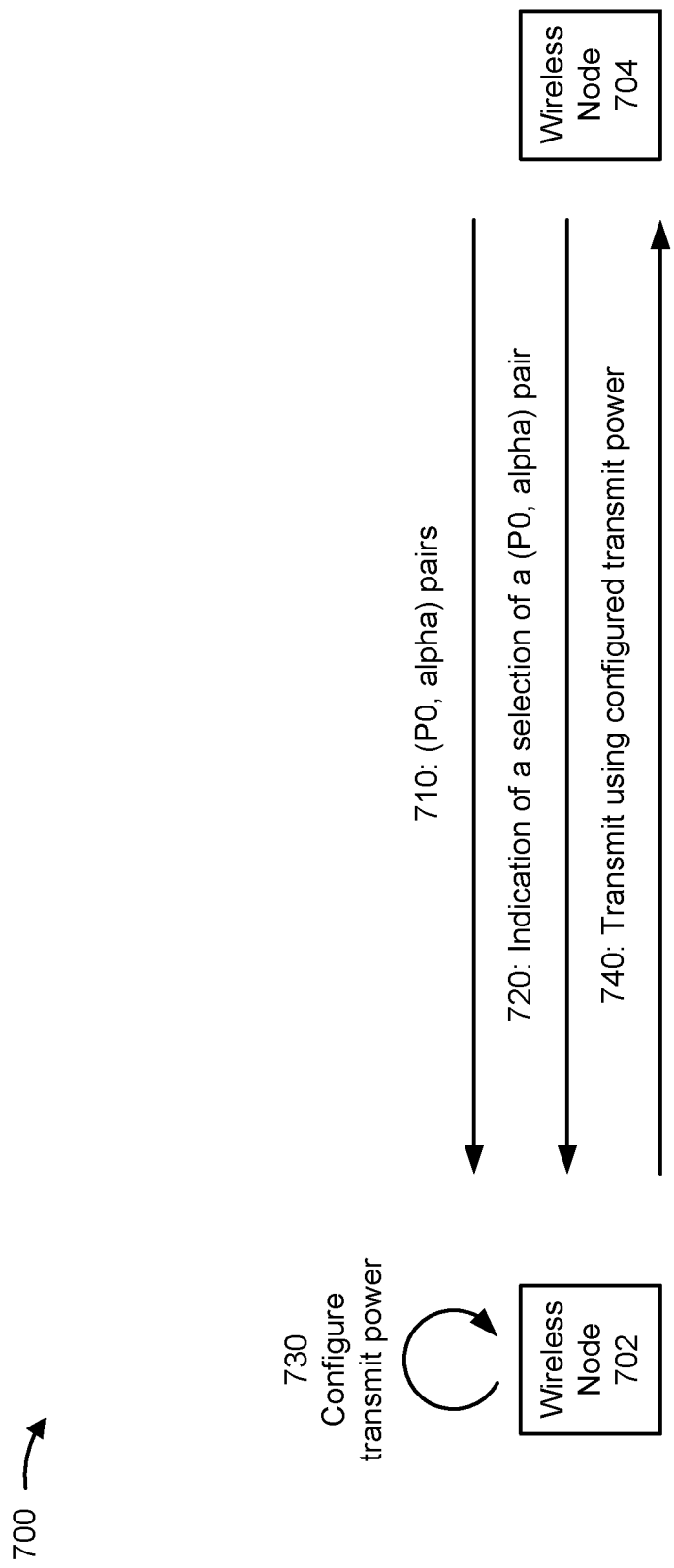

FIG. 7 is a diagram illustrating an example 700 of resource-specific transmit power control configuration, in accordance with various aspects of the present disclosure. As shown in FIG. 7, example 700 includes a first wireless node 702 and a second wireless node 704.

As shown in FIG. 7, and by reference number 710, wireless node 702, from wireless node 704, may receive information identifying a plurality of sets of parameters for a configured-grant scheduled PUSCH. For example, wireless node 702 may receive radio resource control (RRC) signaling configuring a plurality of different P0 and alpha parameters. Additionally, or alternatively, wireless node 702 may receive SRS resource set configuration signaling that identifies the plurality of different P0 and alpha parameters. In this case, each configured SRS resource set may correspond to a plurality of P0 and alpha parameter pairs, thereby enabling wireless node 702 to select a particular P0 and alpha parameter pair based at least in part on a set of resources, a mode of operation, and/or the like, as described below.

In some aspects, wireless node 702 may associate each of the plurality of different P0 and alpha parameters with a set of resources or a mode of operation. For example, wireless node 702 may determine that a first P0 and alpha parameter pair corresponds to a first enhanced duplexing mode and a second P0 and alpha parameter pair corresponds to a second enhanced duplexing mode. Additionally, or alternatively, wireless node 702 may determine that the first P0 and alpha parameter pair corresponds to a first set of slots or resource blocks and a second P0 and alpha parameter pair corresponds to a second set of slots or resource blocks.

In another example, for PUCCH communication, wireless node 702 may receive information identifying a plurality of different P0 values. For example, wireless node 702 may receive a list of spatial relationship information. In some aspects, each element of the list corresponds to a plurality of different P0 values, thereby enabling wireless node 702 to select a particular P0 value, from among the plurality of different P0 values corresponding to an indicated spatial relationship information, based at least in part on an operation mode, a resource, and/or the like.

As further shown in FIG. 7, and by reference number 720, wireless node 702 may receive information identifying an indication of a selection of a P0 and alpha parameter pair. For example, wireless node 702 may receive signaling identifying an upcoming uplink communication, such as a PUSCH, a PUCCH, an SRS, and/or the like. In this case, wireless node 702 may identify an operation mode for the uplink communication, a set of resources for the uplink communication, and/or the like and may determine which P0 and alpha parameter pair to select. Additionally, or alternatively, wireless node 702 may receive explicit signaling identifying the P0 and alpha parameter pair. For example, wireless node 602 may receive a DCI including one or more information elements (IEs) associated with explicitly indicating which P0 and alpha parameter pair to select. Additionally, or alternatively, wireless node 602 may receive a MAC CE-based explicit indication of which P0 and alpha parameter pair to select.

In another example, with regard to PUCCH communication, wireless node 702 may receive information identifying spatial relationship information and may select from a among a plurality of P0 parameters corresponding to the identified spatial relationship information based at least in part on an operation mode, a set of resources, and/or the like. Additionally, or alternatively, wireless node 702 may receive information identifying a plurality of spatial relationship information parameters (e.g., each corresponding to one or more P0 parameters) and may select a particular spatial relationship information from the plurality of spatial relationship information parameters based at least in part on the operation mode, the set of resources, and/or the like. In this case, wireless node 702 may select a P0 parameter from a selected spatial relationship information.

As further shown in FIG. 7, and by reference numbers 730 and 740, wireless node 702 may determine a TPC configuration and may transmit on an uplink based at least in part on the TPC configuration. For example, based at least in part on selecting the P0 and alpha parameter pair, of the plurality of configured P0 and alpha parameter pair, wireless node 702 may determine one or more values for the P0 and alpha parameter pair and may determine a transmit power for transmitting an uplink communication (e.g., in an enhanced duplexing mode) based at least in part on the one or more values for the P0 and alpha parameter pair. In this way, wireless node 702 and wireless node 704 enable resource-specific configuration of an uplink transmit power control for an uplink communication.

As indicated above, FIG. 7 is provided as an example. Other examples may differ from what is described with respect to FIG. 7.

Figure 8:
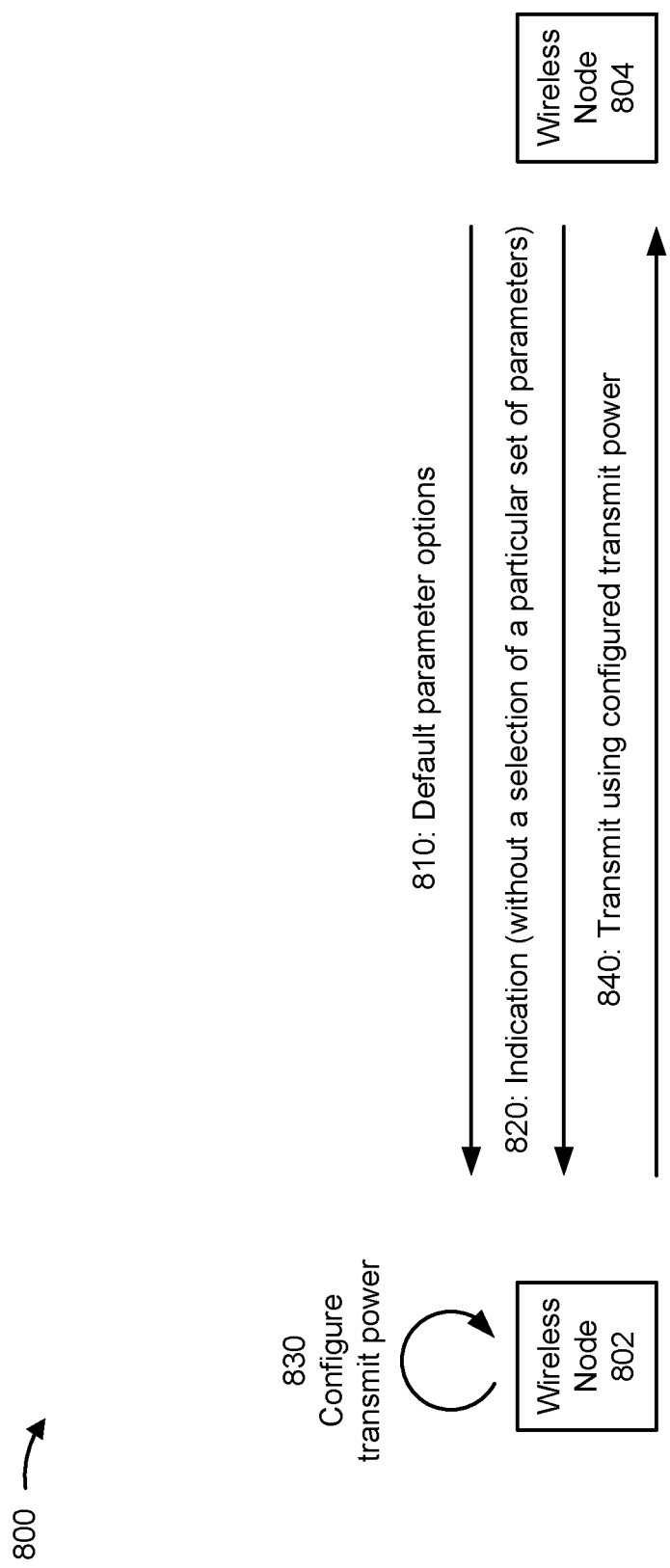

FIG. 8 is a diagram illustrating an example 800 of resource-specific transmit power control configuration, in accordance with various aspects of the present disclosure. As shown in FIG. 8, example 800 includes a first wireless node 802 and a second wireless node 804.

As shown in FIG. 8, and by reference number 810, wireless node 802 may receive, from wireless node 804, information identifying a plurality of sets of parameters for a configured-grant scheduled PUSCH. For example, wireless node 802 may receive RRC signaling configuring a plurality of different P0 and alpha parameters, as described above As further shown in FIG. 8, and by reference number 820, wireless node 802 may attempt to receive information identifying an indication of a selection of a P0 and alpha parameter pair. For example, wireless node 802 may receive a DCI scheduling an uplink communication, but the DCI may lack an SRI field. Alternatively, the DCI may include an SRI field, but wireless node 802 may lack a configured mapping of the SRI field to P0 and alpha parameter pairs. In this case, wireless node 802 may identify an operation mode for the uplink communication, a set of resources for the uplink communication, and/or the like and may determine a default P0 and alpha parameter pair to select. In this case, rather than selecting a single default P0 and alpha parameter pair, wireless node 802 may select from a plurality of possible default P0 and alpha parameter pairs based at least in part on an operation mode or resource for the uplink communication.

As further shown in FIG. 8, and by reference numbers 830 and 840, wireless node 802 may determine a TPC configuration and may transmit on an uplink based at least in part on the TPC configuration. For example, based at least in part on selecting the P0 and alpha parameter pair, of the plurality of default P0 and alpha parameter pairs, wireless node 802 may determine one or more values for the P0 and alpha parameter pair and may determine a transmit power for transmitting an uplink communication (e.g., in an enhanced duplexing mode), as described above.

As indicated above, FIG. 8 is provided as an example. Other examples may differ from what is described with respect to FIG. 8.

Figure 9:
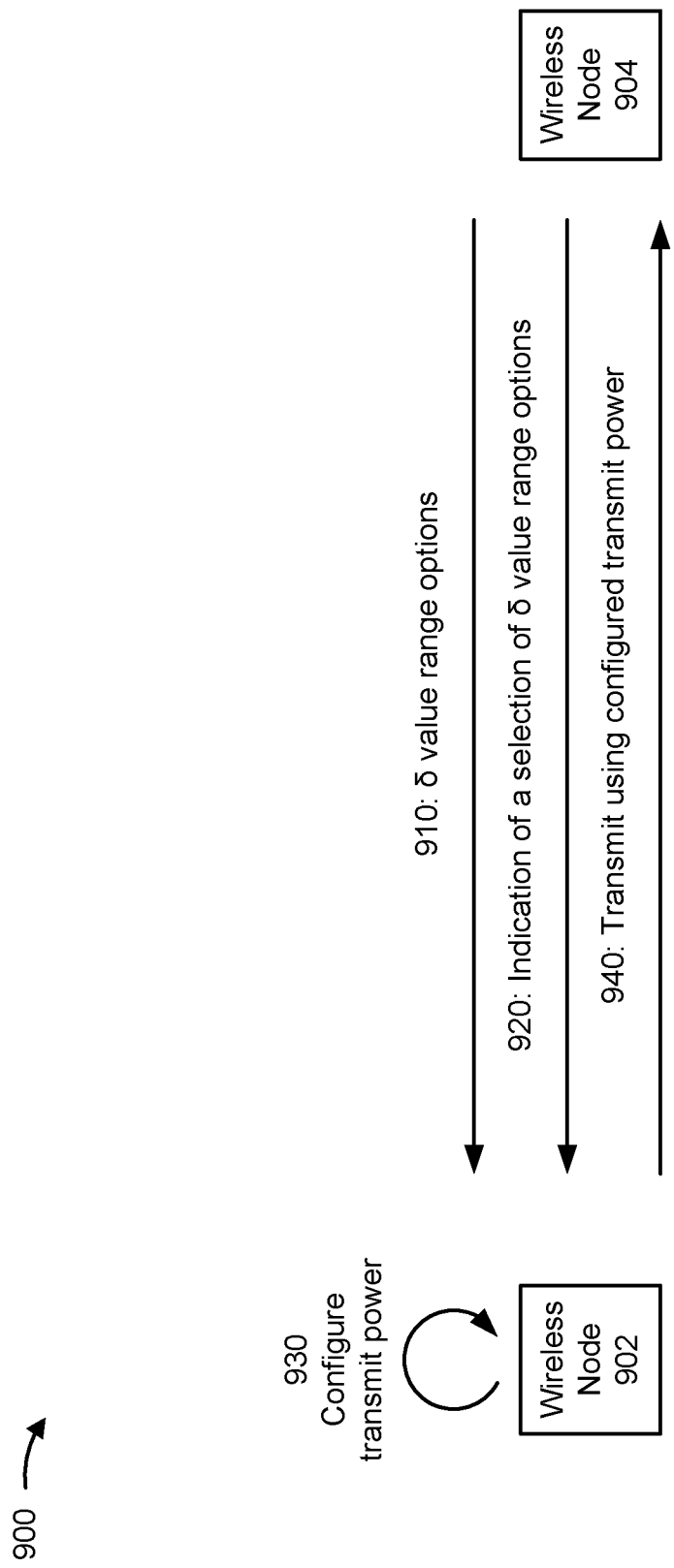

FIG. 9 is a diagram illustrating an example 900 of resource-specific transmit power control configuration, in accordance with various aspects of the present disclosure. As shown in FIG. 9, example 900 includes a first wireless node 902 and a second wireless node 904.

As shown in FIG. 9, and by reference number 910, wireless node 902 may receive, from wireless node 904, information identifying a plurality of sets of parameters for a PUSCH, an SRS, and/or the like. For example, wireless node 902 may signaling identifying a plurality of sets of delta values for closed loop transmit power control. As described above, closed loop power control may be based at least in part on an equation:

$$f_{b,f,c}(i, l) = f_{b,f,c}(i - i_0, l) + \sum_{m=0}^{C(D_i)-1} \delta_{PUSCH,b,f,c}(m, l)$$

where $\delta_{b,f,c}$ (delta) may be an accumulated value or an absolute value for adjusting transmit power based at least in part on a received TPC command. In this case, wireless node 902 may receive a plurality of sets of values for accumulated delta or absolute delta for transmit power control. For example, wireless node 904 may receive signaling configuring a table of accumulated delta and absolute delta values:

| TPC Command Field | Accumulated $\delta_{PUSCH, b, f, c}$ or $\delta_{SRS, b, f, c}$ [dB] | Absolute $\delta_{PUSCH, b, f, c}$ or $\delta_{SRS, b, f, c}$ [dB] |
|---|---|---|
| 0 | −1 or −3 | −4 or −7 |
| 1 | 0 or −1 | −1 or −4 |

-continued

| TPC Command Field | Accumulated $\delta_{PUSCH, b, f, c}$ or $\delta_{SRS, b, f, c}$ [dB] | Absolute $\delta_{PUSCH, b, f, c}$ or $\delta_{SRS, b, f, c}$ [dB] |
|---|---|---|
| 2 | 1 or 0 | 1 or 4 |
| 3 | 3 or 1 | 4 or 7 | where each row corresponds to an interpretation of a TPC command. In some aspects, wireless node 902 may receive signaling identifying a range of values for inclusion in the table. For example, wireless node 902 may receive signaling identifying a first range of values {-1, 0, 1, 3} for association with a first operation mode and a second range of values {-3, -1, 0, 1} for association with a second operation mode. Although some aspects are described in terms of a table or range of values, other data structures are possible. In another example, such as for PUCCH communication, wireless node 902 may receive signaling identifying an accumulated delta (e.g., and not an absolute delta).

In some aspects, based at least in part on receiving information identifying a plurality of values, within accumulated delta and/or absolute delta, for each possible interpretation of a TPC command (e.g., TPC command field 0 may correspond to an accumulated delta of -1 or -3), wireless node 902 is enabled to perform resource-specific transmit power control, as described below. Although some aspects are described in terms of a pair of accumulated delta values or absolute delta values, other numbers of delta values may be possible.

As further shown in FIG. 9, and by reference number 920, wireless node 902 may receive information identifying an indication of a selection of a delta parameter. For example, wireless node 902 may receive a DCI scrambled with a cyclic redundancy check (CRC) scrambled with a TPC-PUCCH radio network temporary identifier (RNTI) that identifies a TPC command for an accumulated delta value. In this case, wireless node 902 may identify an operation mode for the uplink communication, a set of resources for the uplink communication, and/or the like and may determine an accumulated delta value among a plurality of possible accumulated delta values for the received TPC command. For example, wireless node 902 may determine to select the accumulated delta value, based at least in part on the TPC command, from a particular range of accumulated delta values of a plurality of ranges of accumulated delta values.

Additionally, or alternatively, wireless node 902 may receive explicit DCI, MAC CE, or RRC signaling associated with identifying a delta value. For example, wireless node 902 may receive RRC signaling indicating that wireless node 902 is to select from a particular subset of values (e.g., a particular range of values, as described above) when a TPC command is received and may select a particular value from the particular subset of values based at least in part on receiving the TPC command.

As further shown in FIG. 9, and by reference numbers 930 and 940, wireless node 902 may determine a transmit power using closed loop power control and may transmit on an uplink based at least in part on the transmit power. For example, based at least in part on selecting the accumulated delta value, of the plurality of possible accumulated delta values for the received TPC command, wireless node 902 may determine a transmit power for transmitting an uplink communication (e.g., in an enhanced duplexing mode), as described above.

As indicated above, FIG. 9 is provided as an example. Other examples may differ from what is described with respect to FIG. 9.

Figure 10:
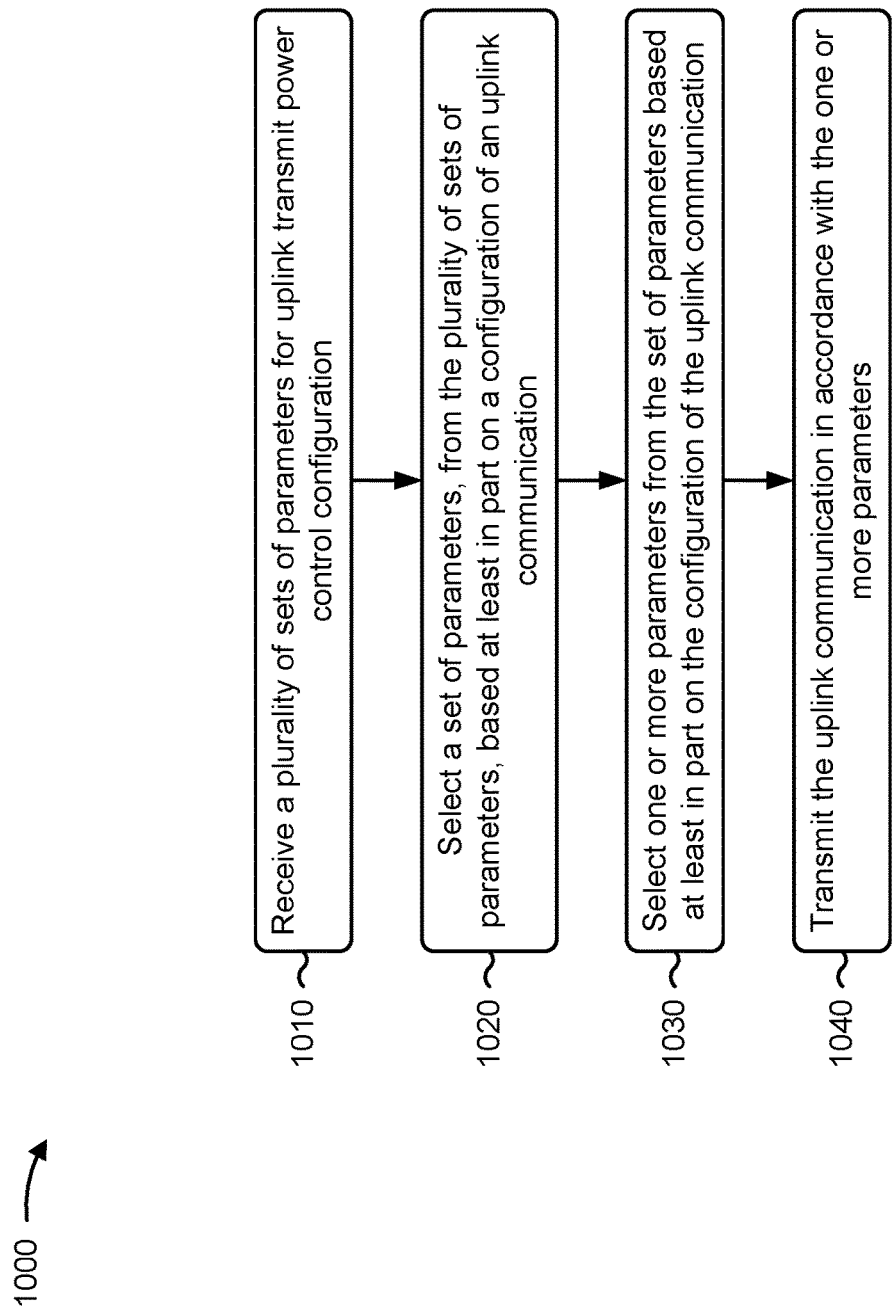
FIG. 10 is a diagram illustrating an example process performed, for example, by a wireless node, in accordance with various aspects of the present disclosure.

FIG. 10 is a diagram illustrating an example process 1000 performed, for example, by a wireless node, in accordance with various aspects of the present disclosure. Example process 1000 is an example where the wireless node (e.g., a BS 110, a UE 120, the wireless nodes 602, 702, 802, and/or 902, the wireless nodes 604, 704, 804, and/or 904, apparatus 1102, and/or the like) performs operations associated with resource-specific transmit power control configuration.

As shown in FIG. 10, in some aspects, process 1000 may include receiving a plurality of sets of parameters for uplink transmit power control configuration (block 1010). For example, the wireless node (e.g., using antenna 234, DEMOD 232, MIMO detector 236, receive processor 238, controller/processor 240, antenna 252, DEMOD 254, MIMO detector 256, receive processor 258, controller/processor 280, reception component 1104 shown in FIG. 11, and/or the like) may receive a plurality of sets of parameters for uplink transmit power control configuration, as described above.

As further shown in FIG. 10, in some aspects, process 1000 may include selecting a set of parameters, from the plurality of sets of parameters, based at least in part on a configuration of an uplink communication (block 1020). For example, the wireless node (e.g., antenna 234, DEMOD 232, MIMO detector 236, receive processor 238, controller/processor 240, antenna 252, DEMOD 254, MIMO detector 256, receive processor 258, controller/processor 280, selection component 1106 shown in FIG. 11, and/or the like) may select a set of parameters, from the plurality of sets of parameters, based at least in part on a configuration of an uplink communication, as described above.

As further shown in FIG. 10, in some aspects, process 1000 may include selecting one or more parameters from the set of parameters based at least in part on the configuration of the uplink communication (block 1030). For example, the wireless node (e.g., controller/processor 240, controller/processor 280, selection component 1106 shown in FIG. 11, and/or the like) may select one or more parameters from the set of parameters based at least in part on the configuration of the uplink communication, as described above.

As further shown in FIG. 10, in some aspects, process 1000 may include transmitting the uplink communication in accordance with the one or more parameters (block 1040). For example, the wireless node (e.g., controller/processor 240, transmit processor 220, TX MIMO processor 230, MOD 232, antenna 234, controller/processor 280, transmit processor 264, TX MIMO processor 266, MOD 254, antenna 252, transmission component 1108 shown in FIG. 11, and/or the like) may transmit the uplink communication in accordance with the one or more parameters, as described above.

Process 1000 may include additional aspects, such as any single aspect or any combination of aspects described below and/or in connection with one or more other processes described elsewhere herein.

In a first aspect, the uplink communication is one of: a physical uplink control channel communication, a physical uplink shared channel communication, a sounding reference signal communication, or a physical random access channel communication.

In a second aspect, alone or in combination with the first aspect, the plurality of sets of parameters is a plurality of mappings of sounding reference signal resource indicators (SRIs) to physical uplink shared channel (PUSCH) power control parameters.

In a third aspect, alone or in combination with one or more of the first and second aspects, signaling associated with identifying the plurality of sets of parameters includes one of: an extended mapping field identifying a plurality of SRI mappings, a non-extended mapping field with a plurality of sub-fields identifying a plurality of SRI mappings, or a plurality of SRI mapping fields corresponding to a plurality communication scenarios.

In a fourth aspect, alone or in combination with one or more of the first through third aspects, selecting the set of parameters includes selecting the set of parameters based at least in part on at least one of: a resource set for the uplink communication, an operation mode for the uplink communication, or an explicit indicator in a control information message.

In a fifth aspect, alone or in combination with one or more of the first through fourth aspects, the set of parameters includes a plurality of pairs of P0 and alpha parameters, and selecting the one or more parameters of the set of parameters comprises selecting a pair of P0 and alpha parameters, of the plurality of pairs of P0 and alpha parameters, based at least in part on at least one of: a resource set for the uplink communication, an operation mode for the uplink communication, or an explicit indicator in a control information message.

In a sixth aspect, alone or in combination with one or more of the first through fifth aspects, selecting the set of parameters includes selecting the set of parameters based at least in part on at least one of a resource set for the uplink communication or an operation mode for the uplink communication.

In a seventh aspect, alone or in combination with one or more of the first through sixth aspects, the uplink communication is a physical uplink shared channel communication and the one or more parameters include a P0 parameter and an alpha parameter.

In an eighth aspect, alone or in combination with one or more of the first through seventh aspects, the uplink communication is a physical uplink control channel (PUCCH) communication and the one or more parameters include a P0 per spatial relation information parameter or a spatial relation information per PUCCH parameter.

In a ninth aspect, alone or in combination with one or more of the first through eighth aspects, the uplink communication is a sounding reference signal communication and the one or more parameters include a P0 parameter and an alpha parameter.

In a tenth aspect, alone or in combination with one or more of the first through ninth aspects, the set of parameters is a range of accumulated delta values or absolute delta values for closed loop power control.

In an eleventh aspect, alone or in combination with one or more of the first through tenth aspects, selecting the set of parameters includes selecting the range of accumulated delta values or absolute delta values based at least in part on at least one of: a resource set for the uplink communication, an operation mode for the uplink communication, signaling dynamically configuring the uplink communication, or signaling identifying the plurality of sets of parameters.

In a twelfth aspect, alone or in combination with one or more of the first through eleventh aspects, an association between the plurality of sets of parameters and the configuration of the uplink communication is explicitly indicated.

In a thirteenth aspect, alone or in combination with one or more of the first through twelfth aspects, an association between the plurality of sets of parameters and the configuration of the uplink communication is based at least in part on a type of a resource on which the uplink communication is scheduled.

In a fourteenth aspect, alone or in combination with one or more of the first through thirteenth aspects, the type of the resource is one of uplink, flexible, downlink, or full-duplex.

In a fifteenth aspect, alone or in combination with one or more of the first through fourteenth aspects, an association between the plurality of sets of parameters and the configuration of the uplink communication is based at least in part on whether the uplink communication is scheduled on a resource that is configured as hard or soft for the wireless node.

In a sixteenth aspect, alone or in combination with one or more of the first through fifteenth aspects, an association between the plurality of sets of parameters and the configuration of the uplink communication is based at least in part on a mode of operation for the uplink communication.

In a seventeenth aspect, alone or in combination with one or more of the first through sixteenth aspects, the mode of operation is determined based at least in part on a semi-static resource allocation, a dynamic scheduling message, or a semi-static scheduling message.

In an eighteenth aspect, alone or in combination with one or more of the first through seventeenth aspects, the mode of operation is based at least in part on whether the wireless node transmits or receives a second communication on resources at least partially overlapping with resources on which the wireless node transmits the uplink communication.

In a nineteenth aspect, alone or in combination with one or more of the first through eighteenth aspects, the one or more parameters include at least one of an open loop power control parameter or a closed loop power control parameter.

In a twentieth aspect, alone or in combination with one or more of the first through nineteenth aspects, the wireless node is a user equipment (UE) or an integrated access and backhauling (IAB)-node mobile terminal (MT) (IAB-MT).

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
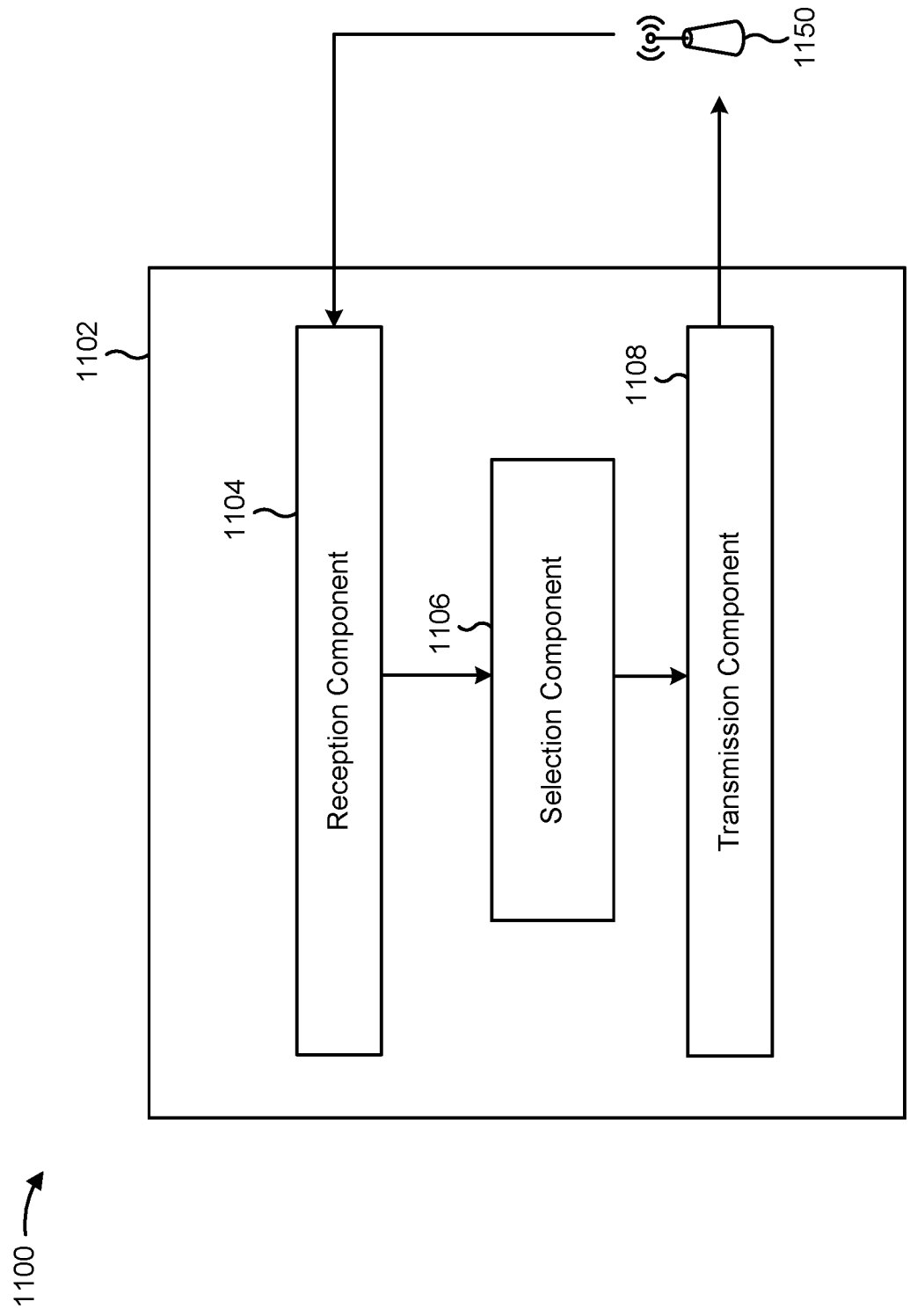
FIG. 11 is a block diagram of an example apparatus for wireless communication, in accordance with various aspects of the present disclosure.

FIG. 11 is a block diagram 1100 illustrating data flow between different components in an example apparatus 1102. The apparatus 1102 may be a UE (e.g., UE 120). In some aspects, the apparatus 1102 includes a reception component 1104, a selection component 1106, and/or a transmission component 1108.

The reception component 1104 may receive, from a wireless node 1150, information identifying a plurality of sets of parameters and/or information identifying a selection of a particular parameter from a set of parameters of the plurality of sets of parameters. For example, the reception component 1104 may receive RRC signaling identifying the plurality of sets of parameters and DCI signaling identifying a parameter to select from a set of parameters of the plurality of sets of parameters. In this case, the selection component 1106 may select a set of parameters, of the plurality of sets of parameters, from which to select the parameter. For example, the selection component 1106 may select a set of parameters, from the plurality of sets of parameters, based at least in part on an operation mode of the apparatus 1102, a resource on which to transmit an uplink communication, and/or the like. In this case, the selection component 1106 may select a signaled parameter from the selected set of parameters. The transmission component 1108 may transmit, to wireless node 1150, using a transmit power configured in accordance with the signaled parameter. For example, the transmission component may transmit a PUSCH communication, a PUCCH communication, an SRS communication, a PRACH communication, and/or the like.

The apparatus may include additional components that perform each of the blocks of the algorithm in the aforementioned process 1000 of FIG. 10 and/or the like. Each block in the aforementioned process 1000 of FIG. 10 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of components (e.g., one or more components) shown in FIG. 11 may perform one or more functions described as being performed by another set of components shown in FIG. 11.

The following provides an overview of aspects of the present disclosure:

Aspect 1: A method of wireless communication performed by a wireless node, comprising: receiving a plurality of sets of parameters for uplink transmit power control configuration; selecting a set of parameters, from the plurality of sets of parameters, based at least in part on a configuration of an uplink communication; selecting one or more parameters from the set of parameters based at least in part on the configuration of the uplink communication; and transmitting the uplink communication in accordance with the one or more parameters.

Aspect 2: The method of aspect 1, wherein the uplink communication is one of: a physical uplink control channel communication, a physical uplink shared channel communication, a sounding reference signal communication, or a physical random access channel communication.

Aspect 3: The method of any one of aspects 1 to 2, wherein the plurality of sets of parameters is a plurality of mappings of sounding reference signal resource indicators (SRIs) to physical uplink shared channel (PUSCH) power control parameters.

Aspect 4: The method of aspect 3, wherein signaling associated with identifying the plurality of sets of parameters includes one of: an extended mapping field identifying a plurality of SRI mappings, a non-extended mapping field with a plurality of sub-fields identifying a plurality of SRI mappings, or a plurality of SRI mapping fields corresponding to a plurality communication scenarios.

Aspect 5: The method of any one of aspects 3 to 4, wherein selecting the set of parameters comprises: selecting the set of parameters based at least in part on at least one of: a resource set for the uplink communication, an operation mode for the uplink communication, or an explicit indicator in a control information message.

Aspect 6: The method of any one of aspects 1 to 5, wherein the set of parameters includes a plurality of pairs of P0 and alpha parameters; and wherein selecting the one or more parameters of the set of parameters comprises: selecting a pair of P0 and alpha parameters, of the plurality of pairs of P0 and alpha parameters, based at least in part on at least one of: a resource set for the uplink communication, an operation mode for the uplink communication, or an explicit indicator in a control information message.

Aspect 7: The method of any one of aspects 1 to 6, further comprising: receiving signaling identifying the configuration of the uplink communication, wherein the signaling does not include a field identifying a selection of the set of parameters; and wherein selecting the set of parameters comprises: selecting the set of parameters based at least in part on at least one of a resource set for the uplink communication or an operation mode for the uplink communication. wherein selecting the set of parameters comprises: selecting the set of parameters based at least in part on at least one of a resource set for the uplink communication or an operation mode for the uplink communication.

Aspect 8: The method of any one of aspects 1 to 7, wherein the uplink communication is a physical uplink shared channel communication and the one or more parameters include a P0 parameter and an alpha parameter.

Aspect 9: The method of any one of aspects 1 to 7, wherein the uplink communication is a physical uplink control channel (PUCCH) communication and the one or more parameters include a P0 per spatial relation information parameter or a spatial relation information per PUCCH parameter.

Aspect 10: The method of any one of aspects 1 to 7, wherein the uplink communication is a sounding reference signal communication and the one or more parameters include a P0 parameter and an alpha parameter.

Aspect 11: The method of any one of aspects 1 to 10, wherein the set of parameters is a range of accumulated delta values or absolute delta values for closed loop power control.

Aspect 12: The method of aspect 11, wherein selecting the set of parameters comprises: selecting the range of accumulated delta values or absolute delta values based at least in part on at least one of: a resource set for the uplink communication, an operation mode for the uplink communication, signaling dynamically configuring the uplink communication, or signaling identifying the plurality of sets of parameters.

Aspect 13: The method of any one of aspects 1 to 12, wherein an association between the plurality of sets of parameters and the configuration of the uplink communication is explicitly indicated.

Aspect 14: The method of any one of aspects 1 to 13, wherein an association between the plurality of sets of parameters and the configuration of the uplink communication is based at least in part on a type of a resource on which the uplink communication is scheduled.

Aspect 15: The method of aspect 14, wherein the type of the resource is one of uplink, flexible, downlink, or full-duplex.

Aspect 16: The method of any one of aspects 1 to 15, wherein an association between the plurality of sets of parameters and the configuration of the uplink communication is based at least in part on whether the uplink communication is scheduled on a resource that is configured as hard or soft for the wireless node.

Aspect 17: The method of any one of aspects 1 to 16, wherein an association between the plurality of sets of parameters and the configuration of the uplink communication is based at least in part on a mode of operation for the uplink communication.

Aspect 18: The method of aspect 17, wherein the mode of operation is determined based at least in part on a semi-static resource allocation, a dynamic scheduling message, or a semi-static scheduling message.

Aspect 19: The method of any one of aspects 17 to 18, wherein the mode of operation is based at least in part on whether the wireless node transmits or receives a second communication on resources at least partially overlapping with resources on which the wireless node transmits the uplink communication.

Aspect 20: The method of any one of aspects 1 to 19, wherein the one or more parameters include at least one of an open loop power control parameter or a closed loop power control parameter.

Aspect 21: The method of any one of aspects 1 to 20, wherein the wireless node is a user equipment (UE) or an integrated access and backhauling (IAB)-node mobile terminal (MT).

Aspect 22: An apparatus for wireless communication at a device, comprising a processor; memory coupled with the processor; and instructions stored in the memory and executable by the processor to cause the apparatus to perform the method of one or more aspects of aspects 1-21.

Aspect 23: A device for wireless communication, comprising a memory and one or more processors coupled to the memory, the memory and the one or more processors configured to perform the method of one or more aspects of aspects 1-21.

Aspect 24: An apparatus for wireless communication, comprising at least one means for performing the method of one or more aspects of aspects 1-21.

Aspect 25: A non-transitory computer-readable medium storing code for wireless communication, the code comprising instructions executable by a processor to perform the method of one or more aspects of aspects 1-21.

Aspect 26: A non-transitory computer-readable medium storing a set of instructions for wireless communication, the set of instructions comprising one or more instructions that, when executed by one or more processors of a device, cause the device to perform the method of one or more aspects of aspects 1-21.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A wireless node for wireless communication, comprising:
    a memory; and
    one or more processors coupled to the memory, the one or more processors configured to:
        receive a plurality of sets of parameters for uplink transmit power control configuration,
            wherein the plurality of sets of parameters includes a plurality of mappings of sounding reference signal resource indicators (SRIs) to physical uplink shared channel (PUSCH) power control parameters;
        select a set of parameters, from the plurality of sets of parameters, based at least in part on a configuration of an uplink communication;
        select one or more parameters from the set of parameters based at least in part on the configuration of the uplink communication; and
        transmit the uplink communication in accordance with the one or more parameters.

2. The wireless node of claim 1, wherein the uplink communication is one of:
    a physical uplink control channel communication,
    a PUSCH communication,
    a sounding reference signal communication, or
    a physical random access channel communication.

3. The wireless node of claim 1, wherein signaling associated with identifying the plurality of sets of parameters includes one of:

an extended mapping field identifying a plurality of SRI mappings,
a non-extended mapping field with a plurality of subfields identifying a plurality of SRI mappings, or
a plurality of SRI mapping fields corresponding to a plurality communication scenarios.

4. The wireless node of claim 1, wherein the one or more processors, when selecting the set of parameters, are configured to:
select the set of parameters based at least in part on at least one of: a resource set for the uplink communication, an operation mode for the uplink communication, or an explicit indicator in a control information message.

5. The wireless node of claim 1, wherein the set of parameters includes a plurality of pairs of P0 and alpha parameters; and
wherein the one or more processors, when selecting the one or more parameters of the set of parameters, are configured to:
select a pair of P0 and alpha parameters, of the plurality of pairs of P0 and alpha parameters, based at least in part on at least one of: a resource set for the uplink communication, an operation mode for the uplink communication, or an explicit indicator in a control information message.

6. The wireless node of claim 1, wherein the one or more processors are further configured to:
receive signaling identifying the configuration of the uplink communication, wherein the signaling does not include a field identifying a selection of the set of parameters; and
wherein the one or more processors, when selecting the set of parameters, are configured to:
select the set of parameters based at least in part on at least one of a resource set for the uplink communication or an operation mode for the uplink communication.

7. The wireless node of claim 1, wherein the uplink communication is a PUSCH communication and the one or more parameters include a P0 parameter and an alpha parameter.

8. The wireless node of claim 1, wherein the uplink communication is a physical uplink control channel (PUCCH) communication and the one or more parameters include a P0 per spatial relation information parameter or a spatial relation information per PUCCH parameter.

9. The wireless node of claim 1, wherein the uplink communication is a sounding reference signal communication and the one or more parameters include a P0 parameter and an alpha parameter.

10. The wireless node of claim 1, wherein the set of parameters is a range of accumulated delta values or absolute delta values for closed loop power control.

11. The wireless node of claim 1, wherein the one or more processors, when selecting the set of parameters, are configured to:
select a range of accumulated delta values or absolute delta values based at least in part on at least one of: a resource set for the uplink communication, an operation mode for the uplink communication, signaling dynamically configuring the uplink communication, or signaling identifying the plurality of sets of parameters.

12. The wireless node of claim 1, wherein an association between the plurality of sets of parameters and the configuration of the uplink communication is explicitly indicated.

13. The wireless node of claim 1, wherein an association between the plurality of sets of parameters and the configuration of the uplink communication is based at least in part on a type of a resource on which the uplink communication is scheduled.

14. The wireless node of claim 13, wherein the type of the resource is one of uplink, flexible, downlink, or full-duplex.

15. The wireless node of claim 1, wherein an association between the plurality of sets of parameters and the configuration of the uplink communication is based at least in part on whether the uplink communication is scheduled on a resource that is configured as hard or soft for the wireless node.

16. The wireless node of claim 1, wherein an association between the plurality of sets of parameters and the configuration of the uplink communication is based at least in part on a mode of operation for the uplink communication.

17. The wireless node of claim 16, wherein the mode of operation is determined based at least in part on a semi-static resource allocation, a dynamic scheduling message, or a semi-static scheduling message.

18. The wireless node of claim 16, wherein the mode of operation is based at least in part on whether the wireless node transmits or receives a second communication on resources at least partially overlapping with resources on which the wireless node transmits the uplink communication.

19. The wireless node of claim 1, wherein the one or more parameters include at least one of an open loop power control parameter or a closed loop power control parameter.

20. The wireless node of claim 1, wherein the wireless node is a user equipment (UE) or an integrated access and backhauling (IAB)-node mobile terminal (MT).

21. A method of wireless communication performed by a wireless node, comprising:
receiving a plurality of sets of parameters for uplink transmit power control configuration,
wherein the plurality of sets of parameters includes a plurality of mappings of sounding reference signal resource indicators (SRIs) to physical uplink shared channel (PUSCH) power control parameters;
selecting a set of parameters, from the plurality of sets of parameters, based at least in part on a configuration of an uplink communication;
selecting one or more parameters from the set of parameters based at least in part on the configuration of the uplink communication; and
transmitting the uplink communication in accordance with the one or more parameters.

22. The method of claim 21, wherein the uplink communication is one of:
a physical uplink control channel communication,
a PUSCH communication,
a sounding reference signal communication, or
a physical random access channel communication.

23. The method of claim 21, wherein signaling associated with identifying the plurality of sets of parameters includes one of:
an extended mapping field identifying a plurality of SRI mappings,
a non-extended mapping field with a plurality of subfields identifying a plurality of SRI mappings, or
a plurality of SRI mapping fields corresponding to a plurality communication scenarios.

24. The method of claim 21, wherein selecting the set of parameters comprises:
selecting the set of parameters based at least in part on at least one of: a resource set for the uplink communication, an operation mode for the uplink communication, or an explicit indicator in a control information message.

25. The method of claim 21, wherein the set of parameters includes a plurality of pairs of P0 and alpha parameters; and
wherein selecting the one or more parameters of the set of parameters comprises:
selecting a pair of P0 and alpha parameters, of the plurality of pairs of P0 and alpha parameters, based at least in part on at least one of: a resource set for the uplink communication, an operation mode for the uplink communication, or an explicit indicator in a control information message.

26. The method of claim 21, further comprising:
receiving signaling identifying the configuration of the uplink communication, wherein the signaling does not include a field identifying a selection of the set of parameters; and
wherein selecting the set of parameters comprises:
selecting the set of parameters based at least in part on at least one of a resource set for the uplink communication or an operation mode for the uplink communication.

27. A non-transitory computer-readable medium storing one or more instructions for wireless communication, the one or more instructions comprising:
one or more instructions that, when executed by one or more processors of a wireless node, cause the wireless node to:
receive a plurality of sets of parameters for uplink transmit power control configuration;
wherein the plurality of sets of parameters includes a plurality of mappings of sounding reference signal resource indicators (SRIs) to physical uplink shared channel (PUSCH) power control parameters;
select a set of parameters, from the plurality of sets of parameters, based at least in part on a configuration of an uplink communication;
select one or more parameters from the set of parameters based at least in part on the configuration of the uplink communication; and
transmit the uplink communication in accordance with the one or more parameters.

28. The non-transitory computer-readable medium of claim 27, wherein signaling associated with identifying the plurality of sets of parameters includes one of:
an extended mapping field identifying a plurality of SRI mappings,
a non-extended mapping field with a plurality of subfields identifying a plurality of SRI mappings, or
a plurality of SRI mapping fields corresponding to a plurality communication scenarios.

29. The non-transitory computer-readable medium of claim 27, wherein the one or more instructions, that cause the wireless node to select the set of parameters, cause the wireless node to:
select the set of parameters based at least in part on at least one of: a resource set for the uplink communication, an operation mode for the uplink communication, or an explicit indicator in a control information message.

30. An apparatus for wireless communication, comprising:
means for receiving a plurality of sets of parameters for uplink transmit power control configuration;
means for selecting a set of parameters, from the plurality of sets of parameters, based at least in part on a configuration of an uplink communication,
wherein the plurality of sets of parameters includes a plurality of mappings of sounding reference signal resource indicators (SRIs) to physical uplink shared channel (PUSCH) power control parameters;
means for selecting one or more parameters from the set of parameters based at least in part on the configuration of the uplink communication; and
means for transmitting the uplink communication in accordance with the one or more parameters.

* * * * *